United States Patent
Garg et al.

(10) Patent No.: US 7,624,350 B2
(45) Date of Patent: Nov. 24, 2009

(54) SYSTEM AND METHOD FOR XML BASED DATA DRIVEN GENERATION OF A COMPOSITE SOURCE USER INTERFACE

(75) Inventors: Man Mohan Garg, Cerritos, CA (US); Alok Mathur, Lake Forest, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 498 days.

(21) Appl. No.: 11/463,876

(22) Filed: Aug. 10, 2006

(65) Prior Publication Data

US 2008/0040679 A1 Feb. 14, 2008

(51) Int. Cl.
*G06F 3/00* (2006.01)
*G06F 3/048* (2006.01)
(52) U.S. Cl. ............... 715/762; 715/744; 715/760; 715/765; 715/866
(58) Field of Classification Search ........... 715/762, 715/760, 765, 780, 866, 744
See application file for complete search history.

(56) References Cited

U.S. PATENT DOCUMENTS

| | | | |
|---|---|---|---|
| 2003/0025732 A1* | 2/2003 | Prichard | 345/765 |
| 2004/0019848 A1* | 1/2004 | Nguyen et al. | 715/513 |
| 2004/0056894 A1* | 3/2004 | Zaika et al. | 345/762 |
| 2004/0230911 A1* | 11/2004 | Bent et al. | 715/762 |
| 2005/0183006 A1* | 8/2005 | Rivers-Moore et al. | 715/513 |
| 2005/0289457 A1* | 12/2005 | Obasanjo et al. | 715/513 |

* cited by examiner

*Primary Examiner*—Tadesse Hailu
*Assistant Examiner*—Nicholas S Ulrich
(74) *Attorney, Agent, or Firm*—Tucker Ellis & West LLP (57) ABSTRACT

The subject application is directed to a system and method for generating a dynamic composite source user interface. Text data is received into a data document stored in associated memory. Data representing each of a plurality of graphical elements that correspond to the received text data is then received. A visual indicator, corresponding to each of the graphical elements, is generated on an associated display. Selection data representing a selection of one of the graphical elements on the associated display is then received. Pointer data is then associated with the selected graphical element. The pointer data is further associated with the text data. Next, the selected graphical element is then displayed on the associated display in conjunction with the text data, as referenced by the pointer data.

20 Claims, 5 Drawing Sheets

SYSTEM AND METHOD FOR XML BASED DATA DRIVEN GENERATION OF A COMPOSITE SOURCE USER INTERFACE

BACKGROUND OF THE INVENTION

The subject application is directed to a system and method for data driven generation of a composite source user interface. In particular, the subject application is directed to a system and method for data driven, dynamic, graphical user interface development. The system and method of the subject application allow for more efficient and easier generation, updating, and modification of a user interface.

Graphical user interfaces provide a user friendly mechanism for interaction with computing systems, including those used in the operation of appliances and devices, such as document processing devices. A well designed graphical user interface allows for effective operation of complex devices with relative ease by unsophisticated or novice users. When such user interfaces are used in connection with document processing devices, in addition to initial setup, there is a frequent need to update or customize the interface as additional functions are added or subtracted, or to address new or updated device features.

The earliest graphical user interfaces required a programmer to manually code all portions of graphical and textual elements forming the display. Any updates or modifications required full reprogramming. More recently, tools have surfaced that allow for greater ease and efficiency in creating or modifying graphical user interfaces.

Currently available graphical user interface development tools and systems allow for the development of a user interface wherein a change in data associated with the user interface allows for the content of the user interface to be changed accordingly. However, the incorporation of an associated graphical element typically requires one to write specialized code to generate it. Additionally, both text and graphical display portions must be merged and communicated to a display, making it difficult or time consuming to modify a display once set.

It would be advantageous to have a system and method that allows for entry of a textual element of a graphical user interface that allows for quick and accurate selection of a corresponding graphical element, which is linked for display along with the textual element.

SUMMARY OF THE INVENTION

In accordance with the subject application, there is provided a system and method for data driven generation of a composite source user interface.

Further, in accordance with the subject application, there is provided a system and method which allows for more efficient and easier generation, updating, and modification of a user interface.

Still further, in accordance with the subject application, there is provided a system and method that allows for entry of a textual element of a graphical user interface that allows for quick and accurate selection of a corresponding graphical element, which is linked for display along with the textual element.

Still further, in accordance with the subject application, there is provided a system for data driven generation of a composite source user interface. The system includes means adapted for receiving text data into a data document stored in an associated memory and means adapted for receiving data representative of each of a plurality of graphical elements that correspond to received text data. The system further includes means adapted for generating, on an associated display, a visual indicator corresponding to each of the plurality of graphical elements and means adapted for receiving selection data representative of a selected one of the plurality of graphical elements. The system also comprises means adapted for associating pointer data with the selected one of the plurality of graphical elements, which pointer data is associated with the text data and means adapted for displaying the selected one of the plurality of graphical elements on the associated display in conjunction with the text data as referenced by the pointer data.

In one embodiment, the system further includes means adapted for receiving a modification to the text data and means adapted for selecting an alternative graphical element in accordance with a received modification to the text data.

In another embodiment, the pointer data is comprised of an XPath query. Preferably, the data document is comprised of a document object model.

In a further embodiment, the plurality of graphical elements include at least one graphical element chosen from the group of a push button, a radio button, a check box, a border box and a scroll bar.

In yet another embodiment, the system further comprises means adapted for selecting an alternative graphical element in accordance with a specified trigger event. Preferably, the trigger event includes a screen switch of the associated display.

Still further, in accordance with the subject application, there is provided a method for data driven generation of a composite source user interface in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for data driven generation of a composite source user interface. In particular, the subject application is directed to a system and method which allows for more efficient and easier generation, updating, and modification of a user interface. More particularly, the subject application is directed to a system and method that allows for entry of a textual element of a graphical user interface that allows for quick and accurate selection of a corresponding graphical element, which is linked for display along with the textual element. It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
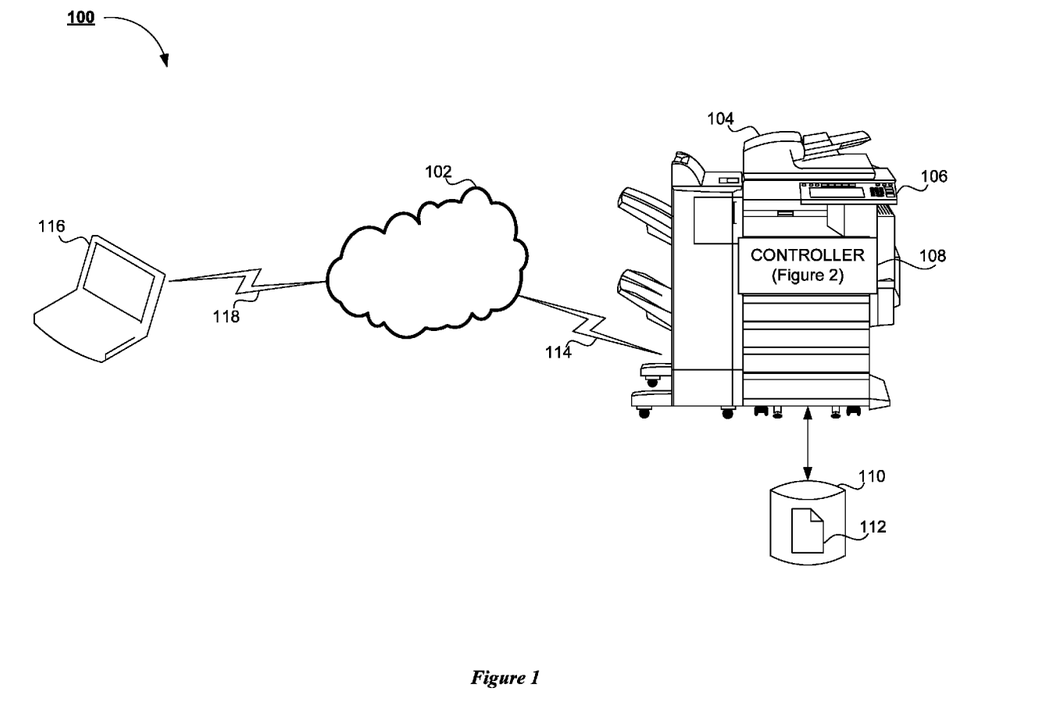
FIG. 1 is an overall diagram of the system for generating a dynamic composite source user interface according to the subject application.

Referring now to FIG. 1, there is shown an overall diagram of the system 100 for data driven generation of a composite source user interface in accordance with the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, or the like, to an associated user, receive input from the associated user, and communicate the same to a backend component, such as a controller 108, as explained in greater detail below. Preferably, the document processing device 104 is communicatively coupled to the computer network 102 via a suitable communications link 114. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for generating a dynamic composite source user interface of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a data document 112, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like. The data document 112 is representative of any object oriented application programming interface that enables the parsing of a programming language into a well defined tree structure and operating on its contents, such as for example and without limitation, a document object module. Preferably, the data document 112 includes data representative of text data, pointer data, event data, trigger data, graphical element data, indicia, or the like.

The system 100 illustrated in FIG. 1 further depicts a user device 116, in data communication with the computer network 102 via a communications link 118. It will be appreciated by those skilled in the art that the user device 116 is shown in FIG. 1 as a laptop computer for illustration purposes only. As will be understood by those skilled in the art, the user device 116 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 118 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 116 is suitably adapted to generate and transmit electronic documents, document processing instructions, user interface modifications, upgrades, updates, personalization data, or the like, to the document processing device 104, or any other similar device coupled to the computer network 102.

Figure 2:
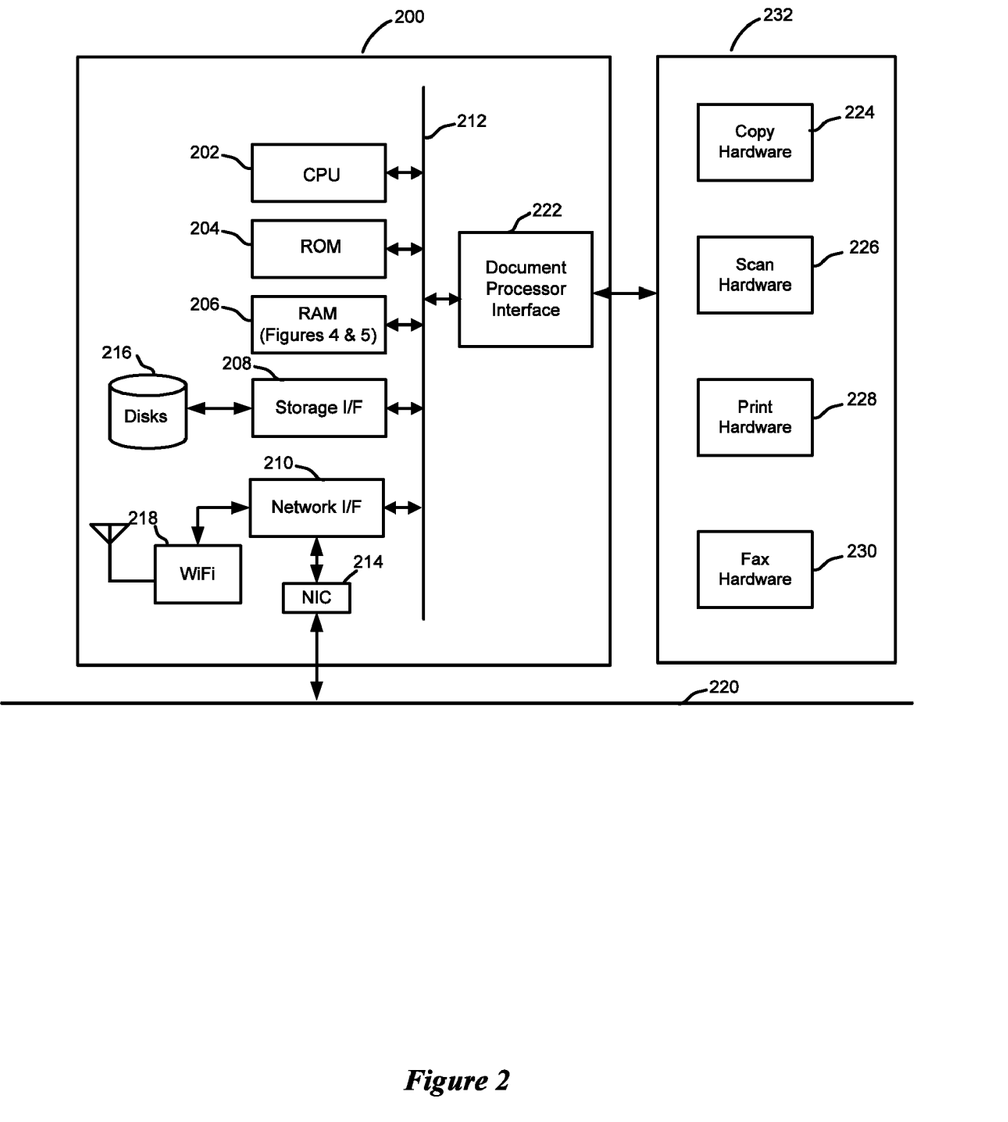
FIG. 2 is a block diagram illustrating controller hardware for use in the system for generating a dynamic composite source user interface according to the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, illustrated in FIG. 1 as the storage device 110, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with bus 212 is a document processor interface 222. Document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
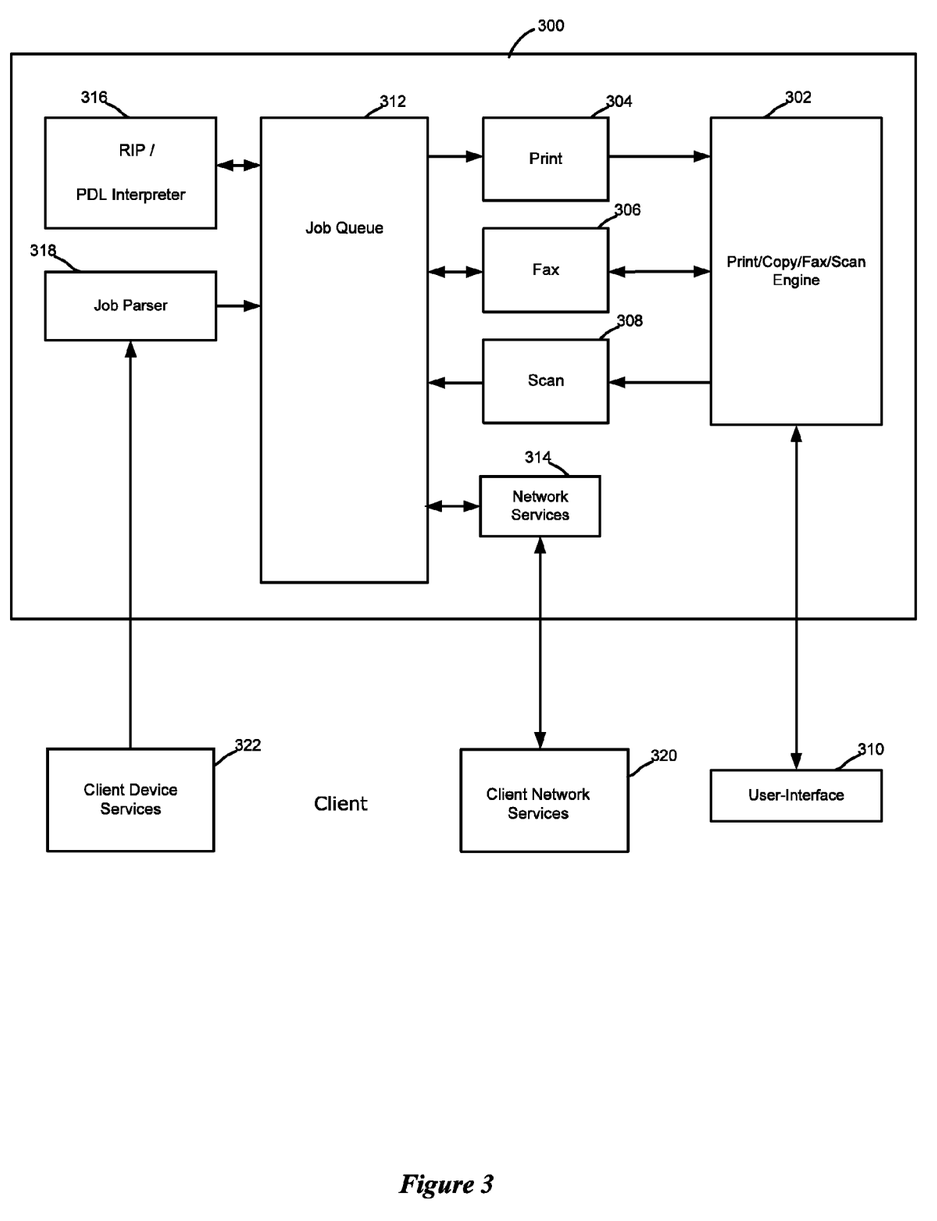
FIG. 3 is a functional diagram illustrating the controller for use in the system for generating a dynamic composite source user interface according to the subject application.

Functionality of the subject system 100 is accomplished on a suitable document processing device 104 that includes the controller 200 of FIG. 2, (shown in FIG. 1 as the controller 108), as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, text data is received into a data document 112 stored in associated memory 110. Data representing each of a plurality of graphical elements that correspond to the received text data is then received. A visual indicator, corresponding to each of the graphical elements, is then generated on an associated display. Selection data representing a selection of one of the graphical elements is then received. Pointer data is then associated with the selected graphical element, wherein the pointer data is also associated with the text data. Next, the selected graphical element is then displayed on the associated display in conjunction with the text data, as referenced by the pointer data.

In accordance with one example embodiment of the subject application, the data document 112, stored in associated memory 110, first receives text data via any suitable means. The skilled artisan will appreciate that suitable text data is capable of originating as an update, upgrade, modification, or the like, from the user device 116, a portable storage medium, user interaction with the associated user interface 106, or the like. In accordance with the preferred embodiment of the subject application, the data document is a document object model document, an XML document, or the like. The backend component, such as the controller 108, then receives data representing graphical elements corresponding to the received text data. The skilled artisan will appreciate that the graphical element data is received by a suitable component of the controller 108. Suitable graphical elements include, for example and without limitation, a push button, a radio button, a check box, a border box, a scroll bar, or the like.

A visual indicator corresponding to each graphical element is then generated on a display associated with the user interface 106. Selection data, corresponding to a selection of one of the visual indicators of a corresponding graphical element is then received by the backend component 108. It will be appreciated by those skilled in the art that such selection data is capable of origination by an associated user via the user interface 106, electronic data communicated from the user device 116, or the like. Pointer data is then associated with the selected graphical element, which is also associated with the text data. Preferably, the pointer data is an XPath query, denoting a location in the XML data document 112 where the text data and the graphical element are located. The selected graphical element is then displayed in conjunction with the text data as referenced by the pointer data.

The backend component, e.g., the controller 108, then determines whether any modifications to the text data have occurred. For example, the controller 108 determines whether an update, upgrade, language change, description, or the like, has been made to the data document 112. When such a modification has been detected by the controller 108, an alternative graphical element is selected in accordance with the received text data modification. The alternative selected graphical element is then displayed in conjunction with the text data as referenced by the pointer data. For example, an alternative graphical element is capable of including, for example and without limitation, push button, a radio button, a check box, a border box, a scroll bar, a window, or the like. The skilled artisan will further appreciate that the alternative graphical element differs suitably from the original graphical element, such that, for example and without limitation, when the original element comprised a check box, the alternative graphical element comprises a checked, or "X"-ed check box, indicating different status, or the like.

When no modification is detected by the controller 108, the controller 108 determines whether a trigger event has occurred. Suitable triggering events include, for example and without limitation, a screen switch on the display associated with the user interface 106, selection of a particular graphical element by an associated user via the display associated with the user interface 106, or the like, as will be understood by those skilled in the art. When such an event is detected by the controller 108, an alternative graphical element is selected in accordance with the specified trigger event. That is, as will be understood by those skilled in the art, the alternative graphical element is capable of being predetermined based upon the type of trigger event detected. Thereafter, the selected alternative graphical element is displayed on the display associated with the user interface 106 in conjunction with the text data as referenced by the pointer data, i.e., the XPath query. For example, an alternative graphical element is capable of including, for example and without limitation, push button, a radio button, a check box, a border box, a scroll bar, a window, or the like. The skilled artisan will further appreciate that the alternative graphical element differs suitably from the original graphical element, such that, for example and without limitation, when the original element comprised a push button, the alternative graphical element comprises a depressed or highlighted, push button, indicating different status, or the like.

As stated above, the preferred embodiment uses an XML structure to facilitate the implementation of the subject application. A suitable example of an XML implementation of the subject application, as used herein, is depicted as:

```
<Window id=1 x=0 y=0 h=480 w=640>
   <events>
   <OnLoad></OnLoad>
   <OnDocumentChange></OnDocumentChange>
   </events>
   <TextBox id=2 x=50 y=50 h=50 w=100>
      <PropertyMapping>
         <value binding="literal">Hello</value>
      </PropertyMapping>
   </TextBox>
   <TextBox id=2 x=150 y=50 h=50 w=100>
      < PropertyMapping >
         <value binding="xpath">Panel/MyPanel/Username</value>
      </PropertyMapping >
   </TextBox>
   <PushButton id=3 x=50 y=150 h=50 w=100>
      < PropertyMapping >
         <caption binding=literal>Click Me!</caption>
      </ PropertyMapping >
      <events>
         <PushButtonClick>
            <EventData>
               <Set xpath="Panel/MyPanel/Username>Jill!</Set>
            </EventData>
         </PushButtonClick>
      </events>
   <PushButton>
</Window>
```

As will be appreciated by those skilled in the art, the use of the XPath query in accordance with the subject application enables developers to customize the behavior of graphical elements, as displayed on the associated user interface 106, change the underlying data document 112, and alternate between screen displays. An example of such an XML implementation of the subject application with respect to customized behavior, i.e., not enabling an increment button if the maximum value has been reached, is evidenced as:

```
<PushButton id="28" x="433" y="25" w="25" h="25">
   <caption>Decrease number of copies</caption>
   <PropertyMappings>
      <enabled binding="select">
         <Select xpath="Jobs/QueueDefaults/Job/CopyJob/Copy/copies">
         <Case value="1">0</Case>
         <Case default="true">1</Case>
         </Select>
      </enabled>
   </ PropertyMappings >
   <events>
   <PushButtonClick>
      <EventData>
      <Set>
      <Option xpath="Jobs/QueueDefaults/Job/CopyJob/Copy/copies"
      method="decrement">1
      </Option>
      </Set>
      </EventData>
   </PushButtonClick>
   </events>
</PushButton>
```

Figure 4:
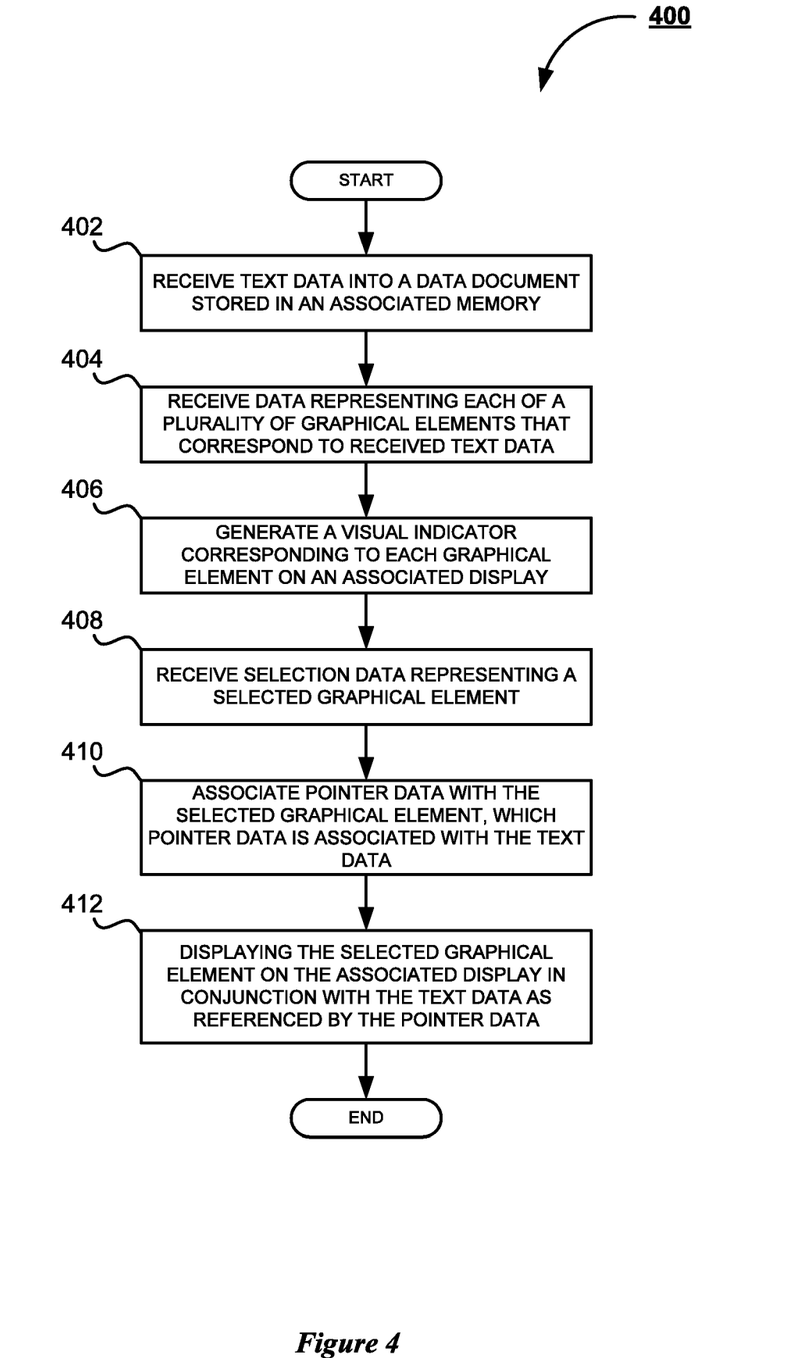
FIG. 4 is a flowchart illustrating a method for generating a dynamic composite source user interface according to the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a method for generating a dynamic composite source user interface in accordance with the subject application. Beginning at step 402, text data is received into a data document 112 stored in an associated memory 110. At step 404, data representing each of a plurality of graphical elements, which correspond to the received text data, are received. In accordance with one embodiment of the subject application, the backend component, e.g., the controller 108, receives the graphical elements from a graphical storage unit, or the like. A visual indicator is then generated on the associated display, at step 406, corresponding to each graphical element. Selection data is then received representing a selected graphical element at step 408. At step 410, pointer data is associated with the selected graphical element, which pointer data is also associated with the received text data. Thereafter, the selected graphical element is displayed on the associated display at step 412 in conjunction with the text data as referenced by the pointer data.

Figure 5:
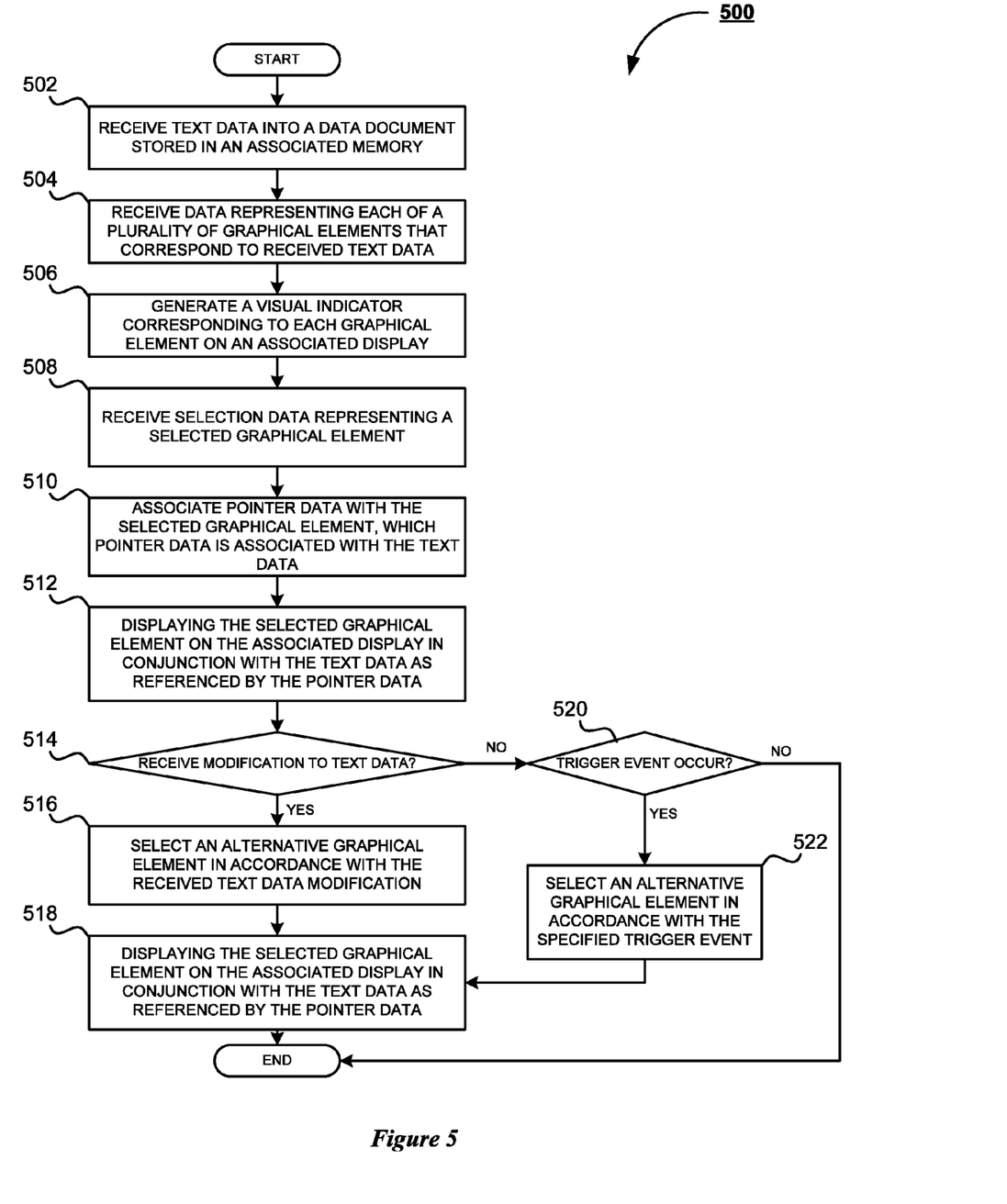
FIG. 5 is a flowchart illustrating a method for generating a dynamic composite source user interface according to the subject application.

Referring now to FIG. 5, there is shown a flowchart 500 illustrating a method for generating a dynamic composite source user interface in accordance with the subject application. The skilled artisan will appreciate that the methodology depicted in FIG. 5 corresponds to graphical and/or textual presentation, as applied to a user interface associated with a document processing device. The use of the subject methodology implemented with respect to a user interface of an associated document processing device is for illustration purposes, and the subject application is not limited only to such an implementation. The method begins at step 502 with the receipt of text data into the data document 112 stored in the associated memory, e.g., data storage device 110. The data document 112 is representative of any object oriented application programming interface that enables the parsing of a programming language into a well defined tree structure and operating on its contents, such as for example and without limitation, a document object module. Preferably, the data document 112 includes data representative of text presentation data, graphical presentation data, event data, trigger data, text data, graphical data, indicia, or the like.

At step 504, the backend component, such as the controller 108, receives data representing each of a plurality of graphical elements that correspond to the received text data. The skilled artisan will appreciate that such graphical elements are capable of being retrieved from an associated storage device, generated internally by the controller 108, received from an external source, or the like. Preferably, the graphical elements include, for example and without limitation, a push button, a radio button, a check box, a border box, a scroll bar, a window, or the like. A visual indicator corresponding to each graphical element is then generated on the display associated with the user interface 106 at step 506. That is, the backend component, e.g., the controller 108, directs the depiction of a visual indicator for each element on a display associated with the user interface 106. Selection data is then received at step 508 corresponding to a selection of one of the graphical elements. Preferably, such selection data is received from an associated user via the user interface 106, remotely via the user device 116, or the like. The skilled artisan will appreciate that such selection data is advantageously received via the user interface 106 by the backend component.

Operations then continue to step 510, wherein pointer data is associated with the selected graphical element, as well as with the received text data. In accordance with the preferred embodiment of the subject application, the pointer data is implemented as, for example and without limitation, an XPath query, or the like. Preferably, the pointer data corresponds to a location in the data document 112 wherein the graphical element and the text data are located. The selected graphical element is then displayed at step 512 on the display associated with the user interface 106 in conjunction with the text data as referenced by the pointer data. The backend component, i.e., controller 108, then determines, at step 514, whether a modification to the text data has been received. That is, the controller 108 determines whether or not a modification, update, upgrade, or the like, has been made to the text data. For example, the backend component, e.g., the controller 108, analyzes the underlying data document 112 for changes. When a modification to the text data has been received, flow proceeds to step 516, whereupon an alternative graphical element is selected in accordance with the received text data modification. The skilled artisan will appreciate that the modification is reflected in the underlying data document 112, while allowing the pointer data to remain unchanged. Thus, as will be understood by those skilled in the art, the change to the text data is relatively transparent to the display associated with the user interface 106. Thereafter, the selected alternative graphical element is displayed on the display associated with the user interface 106 at step 518 in conjunction with the text data as referenced by the pointer data.

When no modification to the text data is detected, flow proceeds to step 520, whereupon a determination is made by the controller 108 whether a trigger event has occurred. Suitable trigger events include, for example and without limitation, a screen switch of the display associated with the user interface 106, an input from an associated user, or the like. It will be appreciated by those skilled in the art that other events, not listed herein, are equally capable of being implemented as trigger events, thereby prompting the selection of an alternative graphical element in accordance with the methodologies described herein. Furthermore, the skilled artisan will appreciate that such events are capable of being predetermined, such that the occurrence of an event has a predetermined alternative graphical element associated therewith. Preferably, the occurrence of such an event is detected by the backend component, i.e., the controller 108. When no trigger event is detected, the operation illustrated in the flowchart 500 of FIG. 5 terminates. When a trigger event is determined to have occurred by the controller 108, an alternative graphical element is selected at step 522 in accordance with the specified trigger event. Thereafter, the selected alternative graphical element is displayed on the associated display at step 518 in conjunction with the text data as referenced by the pointer data. Thus, the change in the graphical element displayed on the associated display is made without affecting the pointer data, i.e., the pointer data still directs retrieval of text data from the same location in the data document 112. The skilled artisan will appreciate that the subject application thereby enables the dynamic modification to the graphical components of the display associated with the user interface 106 based upon the modifications to the underlying data document 112.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A dynamic composite source user interface generator comprising:
    means adapted for receiving text data corresponding to a plurality of machine operation functions of an associated document processing device into a data document stored in an associated memory;
    means adapted for receiving data representative of each of a plurality of graphical elements that correspond to the received text data, wherein each graphical element of the plurality thereof is associated with data corresponding to a function of the document processing device;
    means adapted for displaying a visual indicator corresponding to each of the plurality of graphical elements;
    means adapted for receiving selection data representative of a selected one of the plurality of graphical elements;
    means adapted for associating pointer data with the selected one of the plurality of graphical elements, which pointer data is associated with the received text data;
    means adapted for displaying the selected one of the plurality of graphical elements on a display of the document processing device in conjunction with the received text data as referenced by the pointer data;
    means adapted for receiving selection data corresponding to a selected graphical element and corresponding text data; and
    means adapted for commencing operation of the document processing device with a function corresponding to received selection data.

2. The dynamic composite source user interface generator of claim 1 further comprising:
    means adapted for receiving a modification to the text data; and
    means adapted for selecting an alternative graphical element in accordance with a received modification to the text data.

3. The dynamic composite source user interface generator of claim 1 wherein the pointer data is comprised of an XPath query.

4. The dynamic composite source user interface generator of claim 3 wherein the data document is comprised of a document object model.

5. The dynamic composite source user interface generator of claim 1 wherein the plurality of graphical elements include at least one graphical element chosen from the group of a push button, a radio button, a check box, a border box and a scroll bar.

6. The dynamic composite source user interface generator of claim 1 further comprising means adapted for selecting an alternative graphical element in accordance with a specified trigger event.

7. The dynamic composite source user interface generator of claim 6 wherein the trigger event includes a screen switch of the associated display.

8. A method for generating a dynamic composite source user interface comprising the steps of:
   receiving text data corresponding to a plurality of machine operation functions of an associated document processing device into a data document stored in an associated memory;
   receiving data representative of each of a plurality of graphical elements that correspond to the received text data, wherein each graphical element of the plurality thereof is associated with data corresponding to a function of the document processing device;
   displaying a visual indicator corresponding to each of the plurality of graphical elements;
   receiving selection data representative of a selected one of the plurality of graphical elements;
   associating pointer data with the selected one of the plurality of graphical elements, which pointer data is associated with the received text data;
   displaying the selected one of the plurality of graphical elements on a display of the document processing device in conjunction with the received text data as referenced by the pointer data;
   receiving selection data corresponding to a selected graphical element and corresponding text data; and
   commencing operation of the document processing device with a function corresponding to received selection data.

9. The method for generating a dynamic composite source user interface of claim 8 further comprising the steps of:
   receiving a modification to the text data; and
   selecting an alternative graphical element in accordance with a received modification to the text data.

10. The method for generating a dynamic composite source user interface of claim 8 wherein the pointer data is comprised of an XPath query.

11. The method for generating a dynamic composite source user interface of claim 10 wherein the data document is comprised of a document object model.

12. The method for generating a dynamic composite source user interface of claim 8 wherein the plurality of graphical elements include at least one graphical element chosen from the group of a push button, a radio button, a check box, a border box and a scroll bar.

13. The method for generating a dynamic composite source user interface of claim 8 further comprising the step of selecting an alternative graphical element in accordance with a specified trigger event.

14. The method for generating a dynamic composite source user interface of claim 13 wherein the trigger event includes a screen switch of the associated display.

15. A computer-implemented method for generating a dynamic composite source user interface comprising the steps of:
   receiving text data corresponding to a plurality of machine operation functions of an associated document processing device into a data document stored in an associated memory;
   receiving data representative of each of a plurality of graphical elements that correspond to the received text data, wherein each graphical element of the plurality thereof is associated with data corresponding to a function of the document processing device;
   displaying a visual indicator corresponding to each of the plurality of graphical elements;
   receiving selection data representative of a selected one of the plurality of graphical elements;
   associating pointer data with the selected one of the plurality of graphical elements, which pointer data is associated with the received text data;
   displaying the selected one of the plurality of graphical elements on a display of the document processing device in conjunction with the received text data as referenced by the pointer data;
   receiving selection data corresponding to a selected graphical element and corresponding text data; and
   commencing operation of the document processing device with a function corresponding to received selection data.

16. The computer-implemented method for generating a dynamic composite source user interface of claim 15 further comprising the steps of:
   receiving a modification to the text data; and
   selecting an alternative graphical element in accordance with a received modification to the text data.

17. The computer-implemented method for generating a dynamic composite source user interface of claim 15 wherein the pointer data is comprised of an XPath query.

18. The computer-implemented method for generating a dynamic composite source user interface of claim 17 wherein the data document is comprised of a document object model.

19. The computer-implemented method for generating a dynamic composite source user interface of claim 15 wherein the plurality of graphical elements include at least one graphical element chosen from the group of a push button, a radio button, a check box, a border box and a scroll bar.

20. The computer-implemented method for generating a dynamic composite source user interface of claim 15 further comprising the step of selecting an alternative graphical element in accordance with a specified trigger event.

* * * * *